United States Patent
Cook et al.

(10) Patent No.: US 9,518,675 B2
(45) Date of Patent: Dec. 13, 2016

(54) ROTARY STEM POSITION INDICATOR

(71) Applicant: Array Holdings, Inc., Houston, TX (US)

(72) Inventors: Thomas Cook, Tomball, TX (US); Brandon Marbach, Spring, TX (US)

(73) Assignee: Safoco, Inc., Houston, TX (US)

( * ) Notice: Subject to any disclaimer, the term of this patent is extended or adjusted under 35 U.S.C. 154(b) by 11 days.

(21) Appl. No.: 14/259,148

(22) Filed: Apr. 22, 2014

(65) Prior Publication Data

US 2014/0326338 A1 Nov. 6, 2014

Related U.S. Application Data

(60) Provisional application No. 61/814,398, filed on Apr. 22, 2013.

(51) Int. Cl.
*F16K 37/00* (2006.01)
*F16K 31/50* (2006.01)

(52) U.S. Cl.
CPC ......... *F16K 37/0008* (2013.01); *F16K 31/508* (2013.01); *F16K 37/0041* (2013.01); *F16K 37/0058* (2013.01); *Y10T 137/8225* (2015.04)

(58) Field of Classification Search
CPC .............. F16K 37/0008; F16K 37/0041; F16K 37/0058; F16K 31/508; Y10T 137/8225
See application file for complete search history.

(56) References Cited

U.S. PATENT DOCUMENTS

| | | | |
|---|---|---|---|
| 4,696,325 A * | 9/1987 | Magee | A62C 37/00 137/552 |
| 6,247,536 B1 * | 6/2001 | Leismer | E21B 34/066 166/305.1 |
| 6,905,108 B2 * | 6/2005 | Hall | F15B 15/10 251/285 |
| 2003/0116742 A1 * | 6/2003 | Anderson | F16K 31/508 251/326 |

* cited by examiner

*Primary Examiner* — Mary McManmon
*Assistant Examiner* — Patrick Williams
(74) *Attorney, Agent, or Firm* — Bushman Werner, P.C.

(57) ABSTRACT

A manual gate valve operator used in the oil and gas industry. The operator does not allow an increase or decrease in height when manually rotating the hand wheel. Instead, the operator has an internal indicator nut of the position of the valve. The indicator nut is observable electronically or visually.

8 Claims, 2 Drawing Sheets

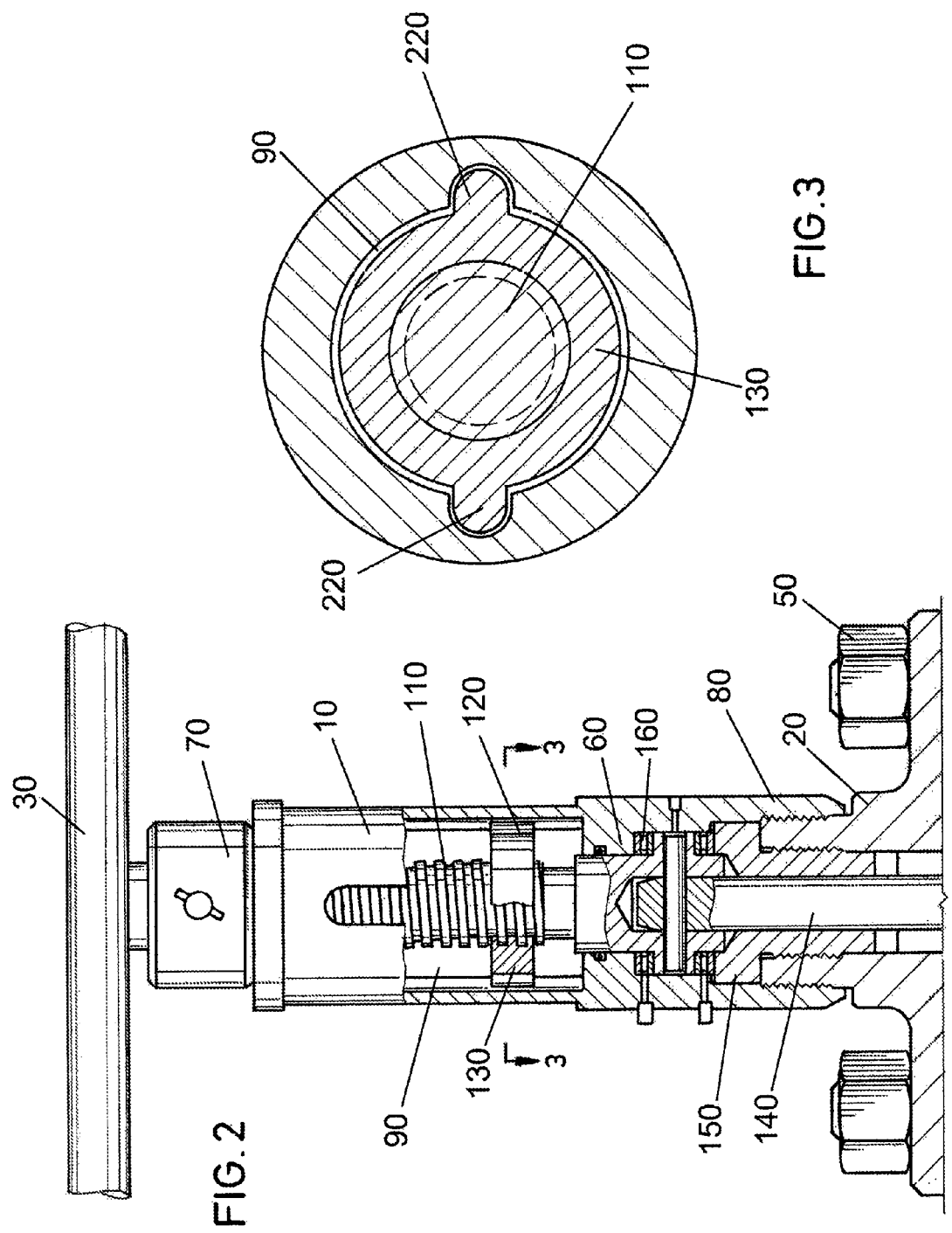

ROTARY STEM POSITION INDICATOR

PRIORITY

This application claims priority to U.S. Provisional Application 61/814,398, filed on Apr. 22, 2013, the contents of which are specifically incorporated herein.

BACKGROUND

Gate valves are generally comprised of a valve body having a central axis aligned with inlet and outlet passages, and a space between the inlet and outlet passages in which a slide, or gate, is moved perpendicular to the central axis to open and close the valve. In the closed position, the gate surfaces typically seal against sealing rings, which surround the fluid passage through the valve body. Gate valves, along with other valve types such as orbit, and butterfly valves, are used to control the flow of a great variety of fluids. Often the fluid to be controlled by the gate valve is under pressure. In the petroleum industry, gate valves are used along piping at various locations, and in particular are used in piping referred to in the petroleum industry as a Christmas tree, which is used as part of a drilling operation.

Actuators to open and close the gate valves include manual operators, diaphragm-type operators, and piston-type operators. Actuators often include a bonnet assembly, which interconnects the valve body and the valve gate, and a bonnet stem, which is movable with the gate via an operator stem.

In many applications in the petroleum industry, actuators have a top shaft extending from the distal end of the actuator such that a worker is able to determine whether the valve is in an open position or a closed position. However, in other applications, such as in a Christmas tree application, the positioning of gate valves is somewhat restricted. In such cases, actuators used to open and close the valves generally do not include a top stem indicator. Similarly, as may be the in manual operation with a turn wheel, a top stem indicator is generally not available due to the positioning of the turn wheel on the actuator.

SUMMARY

Particular embodiments of the disclosure pertain to a mechanism for moving a valve gate between open and closed valve positions within a valve body, the mechanism comprising: a housing having a proximal end oriented toward a gate valve and a distal end oriented away from the gate valve; an operator shaft with a distal end and a proximal end, the distal end operatively connected to a threaded extender adapter, the proximal end extending through a bore of a packing retainer fitted within an internal bore of a bonnet and into a threaded gate valve bore of a gate, the bonnet operatively connected to the proximal end of the actuator housing, and the operator shaft defining a shaft axis; an indicator chamber having a proximal end and a distal end and an interior bore, wherein the threaded extender adapter, itself having a proximal end and a distal end, is positioned within the indicator chamber perpendicular to the shaft axis, the proximal end of the threaded extender adapter being operatively connected to the operator shaft and the distal end extending past the distal end of the indicator chamber; an indicator nut with reciprocal threading, the indicator nut surrounding the threaded extender adapter and being slidably disposed between the proximal end of the indicator chamber and the distal end of the indicator chamber; and wherein rotation of the threaded extender adapter moves the gate of the gate valve in a proximal or distal direction; moves the indicator nut in a proximal or distal direction, and wherein a user is capable of determining a position of the gate by determining if the indicator nut is near the proximal end of the indicator chamber or the distal end of the indicator chamber.

Example embodiments of the present disclosure provide a mechanism for moving a valve between open and closed positions within a valve body, the mechanism including a housing having a first and second end where the second end is oriented toward a valve body and the first end is oriented away from the valve body, an operator shaft with a first end and a second end, the second end including a stem adapter, the second end extending through a bore of a packing retainer fitted within an internal bore of a bonnet and operatively connected to a flow control member, the bonnet operatively connected to the second end of the housing, and the operator shaft defining a shaft axis, an indicator chamber having a first end and a second end and an inner diameter and an outer diameter, the inner diameter including an interior bore, wherein the stem adapter, itself having a first end and a second end, is positioned within the indicator chamber in a substantially parallel position to the shaft axis, the first end of the stem adapter being operatively connected to the operator shaft and the second end extending past the second end of the indicator chamber, an indicator nut wherein the indicator nut surrounds the stem adapter and being slidably disposed between the first end of the indicator chamber and the second end of the indicator chamber, and wherein rotation of the stem adapter moves the flow control member in a first or second direction and moves the indicator nut in a first or second direction corresponding to the direction of the flow control member such that the position of the flow control member is indicated by the position of the indicator nut.

Still further, in embodiments of the disclosure include a mechanism for moving a valve between open and closed positions within a valve body, the mechanism including, wherein the indicator chamber has an elongated opening in the indicator chamber wall. According to other embodiments, a mechanism for moving a valve between open and closed positions within a valve body, wherein the indicator nut threadably surrounds the stem adapter and the inner diameter of the indicator chamber further includes at least one indicator nut channel configured to prevent the indicator nut from freely spinning on the stem adapter.

Still further, in embodiments of the disclosure provide a mechanism for moving a valve between open and closed positions within a valve body, wherein the indicator chamber includes a plurality of bores, each of which extends from the inner diameter through the outer diameter along and are positioned longitudinally along the length of the indicator chamber from a distal most position of the indicator nut towards a proximal most location of the indicator nut and proximity sensors are fitted within the bores. According to another embodiment, the proximity sensors sense the location of the indicator nut and relay the information to an output receiver.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, we briefly describe a more particular description of the disclosure briefly rendered by reference to specific embodiments thereof which are illustrated in the appended drawings. Understanding that these drawings depict only typical embodiments of the disclosure and are therefore not to be considered limiting of its scope, we herein describe the disclosure with additional specificity and detail through the use of the accompanying drawings in which:

FIG. 2 is an elevational sectional view taken along the lines 2-2 of FIG. 1;

FIG. 3 is a top sectional view taken along the lines 3-3 of FIG. 2;

LIST OF REFERENCE NUMERALS

Figure 1:
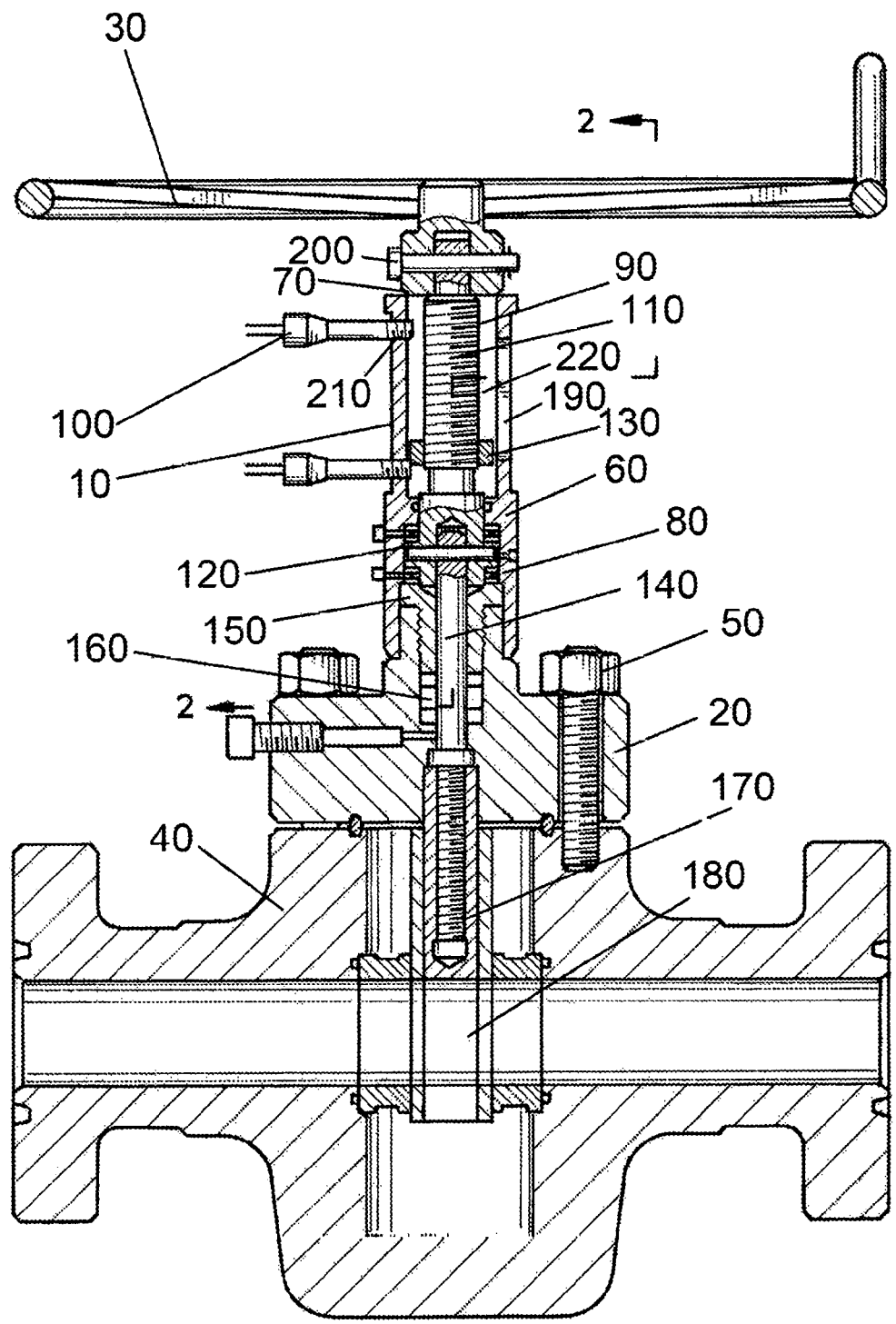
FIG. 1 is an elevational view, partly in section, of an embodiment of the present disclosure employing an indicator nut.

10 indicator housing
20 bonnet
30 hand wheel
40 gate valve body
50 bonnet bolts
60 bearing cap
70 end cap
80 actuator housing proximal portion
90 indicator chamber
100 proximity sensor
110 stem adapter
120 stem adapter flange
130 indicator nut
140 operator stem
150 packing retainer
160 seals
170 threaded gate valve bore
180 gate
190 indicator window
200 hand wheel pin
210 proximity sensor bores
220 indicator nut channel

DETAILED DESCRIPTION

We show the particulars shown herein by way of example and for purposes of illustrative discussion of the preferred embodiments of the present disclosure only. We present these particulars to provide what we believe to be the most useful and readily understood description of the principles and conceptual aspects of various embodiments of the disclosure. In this regard, we make no attempt to show structural details of the disclosure in more detail than is necessary for the fundamental understanding of the disclosure. We intend that the description should be taken with the drawings. This should make apparent to those skilled in the art how the several forms of the disclosure are embodied in practice.

We mean and intend that the following definitions and explanations are controlling in any future construction unless clearly and unambiguously modified in the following examples or when application of the meaning renders any construction meaningless or essentially meaningless. In cases where the construction of the term would render it meaningless or essentially meaningless, we intend that the definition should be taken from Webster's Dictionary 3rd Edition.

As used herein, the term "pipe" means and refers to a fluid flow path.

As used herein, the term "conduit" means and refers to a fluid flow path.

As used herein, the term "line" means and refers to a fluid flow path.

As used herein, the term "fluid" refers to a non-solid material such as a gas, a liquid or a colloidal suspension capable of being transported through a pipe, line or conduit. Examples of fluids include by way of non-limiting examples the following: natural gas, propane, butane, gasoline, crude oil, mud, water, nitrogen, sulfuric acid and the like.

As used herein, the term "attached," or any conjugation thereof describes and refers to the at least partial connection of two items.

As used herein, the term "proximal" refers to a direction toward the center of the valve.

As used herein, the term "distal" refers to a direction away from the center of the valve.

As used herein, slidably connected referrers to one component abutting another component wherein one component is capable of moving in a proximal or distal direction relative to the other component.

Certain embodiments of the disclosure concern a manual actuator for opening and closing a gate valve. In such embodiments, the actuator comprises a housing, a hand wheel, a extender adapter, an operator shaft, a bonnet, and an indicator nut.

In such embodiments wherein a bonnet is concerned, the bonnet is made out of any durable material. In specific embodiments, the bonnet is made of steel. Still further, the bonnet typically has a distal end attached to the actuator housing and a proximal end attached to the distal end of a gate valve body. In embodiments wherein the proximal end of the actuator is attached to the distal end of the valve body, the bonnet is secured by welding, bolts pins, screws, threaded attachments and the like. In certain embodiments wherein the bonnet is secured by bolts, the bonnet has bolt bores parallel to an operator shaft axis which traverse from a distal facing portion of the bonnet into valve body bore holes adapted to receive bolts traversing from the distal facing portion of the bonnet to the valve body bore holes. In such embodiments, the valve body bore holes are threaded so that the bolts secure the bonnet to the valve body.

In embodiments of the disclosure wherein an actuator housing is concerned, the actuator housing, like the bonnet, is constructed out of any durable material designed to allow actuation of a valve from an opened to a closed position and vice versa. Further, in such embodiments, the actuator housing has a proximal end connected to the distal end of the bonnet and a distal end, operatively connected to a hand wheel. Still further, the actuator housing is perpendicular to the shaft axis in most embodiments. In further embodiments regarding the actuator housing, the housing has an external outward facing wall and an internal bore with an inward facing wall, each having a diameter. In such embodiments, the difference between the outward facing wall and the inward facing wall defines a housing thickness.

In certain further embodiments regarding the actuator housing, the housing has a housing bifurcation wherein the inner diameter comprising the inward facing wall is less than the inner diameter of the inward facing wall proximal and distal to the bifurcation. In such embodiments, the diameter of the outward facing wall remains the same such that the bifurcation provides the actuator housing with a greater thickness in the bifurcation area.

Still further, the distal end of the actuator housing is connected to an actuator end cap. In such embodiments, the end cap has a proximal end abutting the distal end of the actuator housing and a distal end abutting a proximal side of the hand wheel.

In further embodiments of the disclosure concerning the actuator housing, the actuator housing has a proximal portion which is proximal to the bifurcation and a distal portion which is distal to the bifurcation.

In embodiments concerning the distal portion of the actuator housing, the distal portion has bores perpendicular to the shaft axis adapted to receive proximity sensors traversing from the outward facing wall of the actuator housing to the inward facing wall of the actuator housing. Alternatively or additively, the actuator housing has a window allowing visual access to the inner bore of the distal portion of the actuator housing.

In embodiments regarding the window, the indicator window in certain embodiments is an actual window made of glass, quartz, acrylic, sapphire crystal and the like. Alternatively, the window, in certain embodiments, is empty of such materials such that a user can see into the actuator. Still further, in such embodiments, the user is able to view the position of the indicator nut, as more fully discussed below, to determine if the valve is in an open or closed position. In many embodiments, the window is an elongated window with an elongation parallel to the shaft axis. In such embodiments, the elongation has a proximal end extending to or near the proximal most place the indicator nut travels and a distal end extending to or near the distal most place the indicator nut travels. While the distance of the elongation need not be exact, in the embodiments disclosed herein concerning a window, a user is at all times able to see the position of the indicator nut.

In embodiments concerning the extender adapter, the extender adapter has a proximal end oriented toward the gate valve and a distal end connected to the hand wheel. Still further, in many embodiments, the proximal end has an extender adapter flange with a proximal side and a distal side such that the extender adapter is retained from travel in a distal direction by the interaction of the proximal side of the housing bifurcation and the distal side of the extender adapter flange such that these elements abut each other.

Still further, in embodiments of the disclosure concerning the extender adapter, distal to the extender adapter flange and the housing bifurcation, the extender adapter possesses threading. In this embodiment, the threading is adapted to receive an indicator nut, which is capable of traveling in a proximal or distal direction and vice versa as the hand wheel is rotated and the gate moves from a closed position to an open position and vice versa. In certain embodiments, the indicator nut is able to move from a distal most position at the proximal side of the end cap to a proximal most position at the distal side of the housing bifurcation.

In further embodiments, concerning the proximity sensors, the proximity sensors sense the position of the indicator nut to determine whether the valve is in an open or closed position. In certain embodiments, the proximity sensors are capable of sensing magnetic field, and the indicator nut is magnetic. In certain other embodiments, the proximity sensors sense the indicator nut optically. In such embodiments, the proximity sensors detect the indicator nut by reflection of a light generated by the sensor against the proximity nut. In other embodiments, the proximity sensors detect the indicator nut by viewing the proximity nut within the distal portion of the actuator housing wherein the light source is the window. In other embodiments, the indicator nut possesses a material which glows such that the proximity sensor is capable of sensing the glowing indicator nut. In certain other embodiments, the proximity sensors are capable of sensing radiation and the indicator nut possesses radiological properties such as radioactive paint, a radioactive dye, a radioactive glaze, a radioactive ceramic area, or the nut is comprised of a radioactive isotope. In certain other embodiments concerning radiation, the nut comprises a combination of radiation sources.

In further embodiments referring to the proximity sensors, they are connected to a read out device. In certain embodiments, the read out device is a computer. The computer implements various procedures and operations in the form of computer executable program code, computer executable and computer readable media, and other hardware, firmware and software module, network, application and interface platforms. In certain further embodiments the computer is connected to interface controllers including but not limited to a graphical user interface, an input/output controller, an output device, an input device, and storage devices. In certain further embodiments the computer is connected to a network. Networks comprise a network controller connecting the processor to a network, where the client side, server side, and user network devices reside and both interact and operate communicatively over the network.

In the aforementioned computer embodiments, a user is able to view the read out device or preferably a graphical user interface to determine the position of the valve, as the proximity sensors are connected to the read out device. In still further embodiments, the computer acts as a controller and controls a motor mounted on top of the actuator body to rotate the threaded extender adapter. In this embodiment a hand wheel is not needed. Alternatively, in this embodiment a hand wheel is used in the event that the user determines the position of the valve while standing next to the actuator or if the motor is broken.

In embodiments concerning the proximal portion of the actuator housing, the housing possesses the operator shaft. In embodiments of the disclosure concerning the operator shaft, the operator shaft has a distal end abutting the proximal end of the extender adapter such that rotation of the extender adapter in turn rotates the operator shaft. Likewise, the operator shaft in certain embodiments has a threaded proximal end adapted to be received by a gate bore of the gate such that rotation of the operator shaft within the gate bore moves the gate in a proximal or distal direction.

Further, regarding the bonnet and the operator shaft, the bonnet possesses a bonnet bore traversing from the distal side of the bonnet to the proximal side of the bonnet. The bonnet bore is adapted to receive the operator shaft such that the operator shaft traverses the bore from the proximal side of the bonnet to the distal side of the bonnet.

Further, regarding the bonnet and the operator shaft of the present disclosure, in some embodiments, the bonnet bore is adapted to receive a packing retainer, which itself possesses a packing retainer bore. In such embodiments, the operator shaft traverses from the distal side of the packing retainer to the proximal side of the packing retainer. As such the operator shaft traverses the bonnet bore as well. The packing retainer, in certain embodiments, has a proximal end which is distal to the proximal end of the bonnet bore, creating a bonnet bore cavity. In such embodiments, seals are positioned within the bonnet bore cavity to block the flow of fluid from the valve, if any.

FIG. 1 is a cross sectional illustration of the present disclosure employing an indicator nut. As can be seen in FIG. 1, the actuator has an actuator housing 10 having a proximal end connected to a bonnet 20 and a distal end operatively connected to a hand wheel 30. The actuator housing 10 is perpendicular to a shaft axis. The actuator housing 10 has an external outward facing wall and an internal bore with an inward facing wall, each having a diameter. The difference between the outward facing wall and the inward facing wall defines a housing thickness.

As can be further seen in FIG. 1, the bonnet 20 has a distal end connected to the proximal end of the actuator housing. Likewise, the bonnet has a proximal end attached to the distal end of a gate valve 40. Bonnet bolts 50 secure the bonnet to the valve body 40.

Regarding the actuator housing 10, the actuator housing has a housing bifurcation 60 wherein the inner diameter comprising the inward facing wall is less than the inner diameter of the inward facing wall proximal and distal to the bifurcation.

The distal end of the actuator housing 10, which is distal to the housing bifurcation 60, abuts an actuator end cap 70. The proximal end of the end cap 70 abuts the distal end of the actuator housing 10 and distal end of the actuator end cap 70 abuts the hand wheel 30.

For purposes of illustration in FIG. 1, the actuator housing 10 is divided into an actuator housing proximal portion 80 situated proximal to the housing bifurcation 60, and an indicator chamber 90 situated distal to the housing bifurcation. As can be seen in FIG. 1, the indicator chamber 90 has bores perpendicular to the shaft axis into which proximity sensors 100 are attached. An indicator window 190 is also present.

Traversing the indicator chamber is the stem adapter 110 which extends from the hand wheel 30 to the housing bifurcation. As is further illustrated in FIG. 1, the stem adapter 110 has a stem adapter flange 120 at its proximal end. The stem adapter flange 120 is shown abutting the proximal side of the housing bifurcation 60, thereby preventing distal movement of the stem adapter 110.

The threading of the stem adapter 110 as depicted in FIG. 1, is adapted to be received by an indicator nut 130, which is positioned within the indicator chamber 90.

As can be further seen in FIG. 1, the operator shaft is situated within actuator housing proximal portion 80. The operator shaft 140 has a distal end operatively connected to the stem adapter 110 and a proximal end traversing through a packing retainer bore of the packing retainer 150. The packing retainer 150 is further positioned within the bonnet bore of the bonnet 20. Proximal to the packing retainer are seals 160 preventing leakage of fluid from the gate valve body 40.

As is further seen in FIG. 1, the proximal end of the operator shaft 140 is threaded and received by the reciprocally threaded gate valve bore 170. Upon rotation of the operator shaft 140, the threads of the proximal end of the operator shaft, in conjunction with the threaded gate valve bore 170 pull or push the gate 180 in a proximal or distal direction to open or close the gate valve 40.

As can be seen in FIG. 1, the actuator housing 10, and in particular the indicator chamber 90 illustrates the window 190 showing the stem adapter 110 and the indicator nut 130. To prevent rotation of the hand wheel 30, an anti-rotation pin 200 is inserted into the end cap 70.

As can be seen in FIG. 1 the actuator housing 10, and in particular the indicator chamber 90 illustrates the proximity sensors 100 being inserted into proximity sensor bores 210 running perpendicular to the shaft axis. In this depiction there is one proximity sensor in the proximal portion of the indicator chamber 90. There can be multiple proximity sensor bores 210 near the distal end of the indicator chamber 90, thereby allowing indicator nut 130 position sensing in different valve configurations, wherein a different valve will only have the indicator nut 130 move a short distance, an intermediate distance or a long distance to open or close the valve.

FIG. 3 is a top sectional view of an indicator chamber according to an embodiment of the present disclosure. Indicator housing 10 includes an inner and outer diameter, with a bore defining indicator chamber 90. As shown, indicator nut 130 is generally circular with two shaped extensions on opposite sides, which are complementary to an inner indicator housing bore defining an indicator nut channel 220. Indicator nut channel 220 prevents indicator nut 130 from freely spinning with stem adapter 110 and results in longitudinal movement to indicate the position of flow control member 180.

From the foregoing description, one of ordinary skill in the art can easily ascertain the essential characteristics of this disclosure, and without departing from the spirit and scope thereof, can make various changes and modifications to adapt the disclosure to various usages and conditions. For example, we do not mean for references such as above, below, left, right, and the like to be limiting but rather as a guide for orientation of the referenced element to another element. A person of skill in the art should understand that certain of the above-described structures, functions, and operations of the above-described embodiments are not necessary to practice the present disclosure and are included in the description simply for completeness of an exemplary embodiment or embodiments. In addition, a person of skill in the art should understand that specific structures, functions, and operations set forth in the above-described referenced patents and publications can be practiced in conjunction with the present disclosure, but they are not essential to its practice.

The disclosure can be embodied in other specific forms without departing from its spirit or essential characteristics. A person of skill in the art should consider the described embodiments in all respects only as illustrative and not restrictive. The scope of the disclosure is, therefore, indicated by the appended claims rather than by the foregoing description. A person of skill in the art should embrace, within their scope, all changes to the claims which come within the meaning and range of equivalency of the claims. Further, we hereby incorporate by reference, as if presented in their entirety, all published documents, patents, and applications mentioned herein.

The invention claimed is:

1. In an assembly comprising a valve and an actuator operatively connected to the valve, said valve including a valve body, a valve element reciprocally mounted in said valve body, a valve shaft having a valve shaft axis and being operatively connected to said valve element on a first end, the second end of said shaft being operatively connected to said actuator, an improvement comprising:
  an actuator housing having a generally cylindrical wall having an inner wall surface and an outer wall surface, an annular radially inwardly extending shoulder formed on said inner wall surface, said housing having an upper end and a lower end, and defining an elongate chamber having a long axis, said lower end being adapted to be connected to said valve body, and a window formed in said wall;
  an actuator stem positioned in said chamber and having a first stem end and a second stem end, said second stem end being adapted to be connected to said second end of said shaft;

an annular radially outwardly extending flange connected to said stem, said flange being positioned between said shoulder and said lower end of said housing;

an indicator nut having an outer periphery and being threadedly received on a threaded portion of said stem;

an anti-rotation dog extending radially outwardly from said outer periphery of said nut;

an elongate channel formed in said inner wall surface defining said chamber, said channel being circumferentially spaced from said window, said dog being received in said channel, wherein rotation of said stem causes reciprocal movement of said valve shaft and said nut, the position of said nut being viewable through said window, movement of said stem in a direction away from said lower end limited by engagement of said flange with said shoulder.

2. The assembly of claim 1, wherein said window comprises an elongated opening.

3. The assembly of claim 1, wherein the valve is a gate valve.

4. The assembly of claim 1, wherein at least one bore extending through said cylindrical wall.

5. The assembly of claim 4, wherein a proximity sensor is fitted within the at least one bore.

6. The assembly of claim 4, wherein there are a plurality of said bores positioned longitudinally along the length of said actuator housing from a distal most position of the indicator nut towards a proximal most location of the indicator nut.

7. The assembly of claim 6, wherein a proximity sensor is fitted in each of said bores.

8. The assembly of claim 7, wherein the proximity sensors sense the location of said indicator nut and relay the information to an output receiver.

\* \* \* \* \*